United States Patent [19]

Smyth et al.

[11] Patent Number: 4,506,136

[45] Date of Patent: Mar. 19, 1985

[54] PLASMA SPRAY GUN HAVING A GAS VORTEX PRODUCING NOZZLE

[75] Inventors: Richard T. Smyth, Huntington; Raymond A. Zatorski, Port Jefferson Station, both of N.Y.

[73] Assignee: Metco, Inc., Westbury, N.Y.

[21] Appl. No.: 434,138

[22] Filed: Oct. 12, 1982

[51] Int. Cl.[3] ..................................................... B23K 9/00

[52] U.S. Cl. ........................ 219/121 PL; 219/121 PP; 219/121 PQ; 219/76.16; 313/231.51

[58] Field of Search ...... 219/121 P, 121 PM, 121 PP, 219/121 PQ, 76.16, 121 PL, 75; 313/231.3, 231.4, 231.51

[56] References Cited

U.S. PATENT DOCUMENTS

| | | | |
|---|---|---|---|
| 3,366,772 | 1/1968 | Wickham et al. | 219/121 PP |
| 3,676,638 | 7/1972 | Stand | 219/121 PQ |
| 3,823,302 | 7/1974 | Muehlberger | 219/121 PP |
| 3,851,140 | 11/1974 | Coucher | 219/121 PQ |
| 4,059,743 | 11/1977 | Esibian et al. | 219/121 PP |

*Primary Examiner*—M. H. Paschall

*Attorney, Agent, or Firm*—F. L. Masselle; E. T. Grimes; J. D. Crane

[57] ABSTRACT

A plasma flame spray gun suitable for being constructed physically smaller than comparable power prior art plasma flame spray guns. The gun includes a nozzle having a tapering portion on the inlet side thereof. A cathode with a flat tip is positioned to at least partially extend into the tapering portion of the nozzle. A gas distribution ring is located around the cathode for creating a vortex around the cathode tip. This causes the arc formed between the tip and the nozzle to have a root which spins around the perimeter of the nozzle tip resulting in less wear and, therefore, extended part life.

23 Claims, 2 Drawing Figures

PLASMA SPRAY GUN HAVING A GAS VORTEX PRODUCING NOZZLE

The present invention relates generally to the field of plasma guns such as described in U.S. Pat. No. 3,145,287 and more particularly to a plasma gun having a number of features which make the plasma gun described herein more easily reduced in size while at the same time providing extended component life.

In typical plasma guns known in the prior art, the gun includes a nozzle for directing the plasma. The gun is usually provided with a liquid cooling jacket around various parts thereof to prevent them from melting. An electrode is typically located near the nozzle and an arc is formed between the electrode and the nozzle wall. A plasma gas is introduced into this arc which is excited thereby and issues from the nozzle in the form of a plasma flame.

The power level of the gun is controlled by controlling the voltage and/or the current. Prior art guns have typical power ranges of from about 5 to about 80 KW. At such large power levels, both the nozzle and the electrodes are subject to wear and in due course need to be replaced despite the fact that liquid cooling is provided. When the physical size of the plasma gun parts is reduced as the gun may be used, for example, to spray and coat the inside of pipes, the power level must also be reduced to achieve reasonable nozzle and electrode life.

In the prior art, plasma spray guns are known with those described in U.S. Pat. Nos. 3,823,302 and 4,164,533 being typical. The design of the guns in those two patents, however, is not well suited for making physically small plasma guns for spraying in small areas such as the inside of a pipe.

Accordingly, it is a primary objective of the invention to provide a plasma spray gun which may be physically quite small so as to fit into small spaces and yet have high efficiency.

It is still a further objective of this invention to provide a spray gun which may be made physically quite small but which can operate at higher power levels than prior art plasma guns of comparable size.

It is another objective of the present invention to provide a plasma spray gun which is physically small, operates at higher power levels than prior art guns of the same size while part life is at least as good as prior art guns of comparable size operating at lower power levels.

These and other objects, advantages and features of the present invention are achieved by the present compact design which includes a sandwich of a forward member, an intermediate insulator member and a rear member. The forward member is in electrical contact with a nozzle. The rear member includes a removable cathode with a flat tip which at least partially projects into the tapering portion of the nozzle. The insulator member includes a gas distribution chamber encircling the cathode with gas introducing passages to permit gas flow into the area between the insulator member and the cathode. The gas introducing passages are arranged so that the gas flow is in a vortex.

When the gun is coupled to electrical power, an arc forms between the nozzle and the periphery of the tip of the cathode. This arc has its root (the attachment point to the tip) spin around the periphery of the flat tip due to the vortex of the gas. In this way, the arc moves about inside the gun avoiding local area heat building which can result in melting of gun parts.

DESCRIPTION OF THE DRAWINGS

The foregoing and other objects, advantages and features of the present invention are described below in greater detail in connection with drawings which form a part of the disclosure wherein.

DETAILED DESCRIPTION

Figure 1:
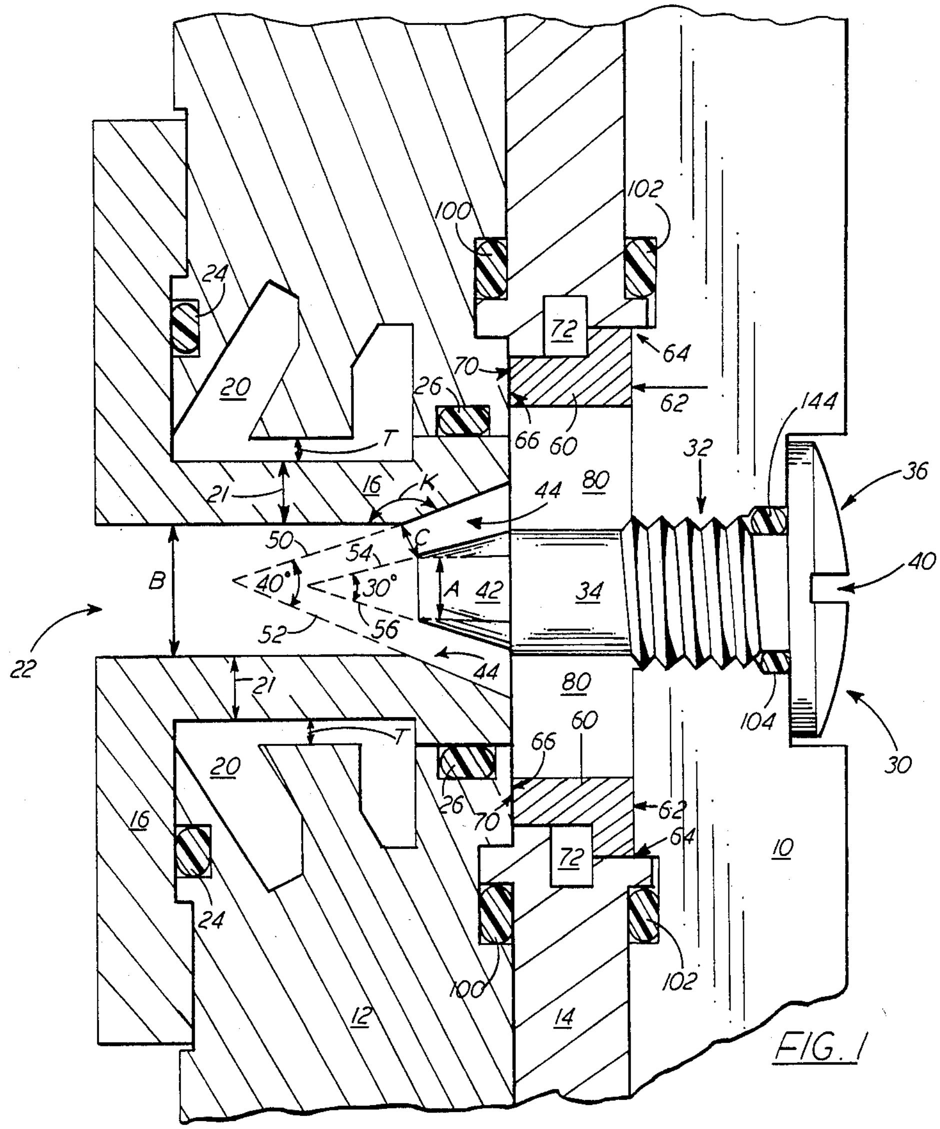
FIG. 1 is a vertical sectional view taken through the plasma gun of the present invention.

FIG. 1 illustrates the most pertinent features of the plasma spray gun of the present invention. This plasma spray gun is typical of prior art plasma spray guns in that it includes a cathode body 10, an anode body 12 and an insulator block 14 disposed therebetween. The cathode body 10, the anode body 12 and the insulator block 14 are held in the position as illustrated in FIG. 1 by conventional bolting arrangements which electrically isolate the anode 12 from the cathode 10 in a manner well known in the prior art and, therefore, have not been illustrated in order to simplify the drawing.

The plasma gun includes a nozzle insert 16 preferably made of copper (or perhaps copper with a tungsten liner) which is in electrical contact with the anode body 12. In addition, the nozzle insert 16 and the anode body 12 are shaped so as to form a coolant passage 20 therebetween. The coolant passage 20 is coupled by conventional bores through the anode body 12 to an external source of cooling fluid (not shown), which is pumped, in a conventional manner, through the coolant passage 20 during operation of the plasma gun. Sufficient coolant must be pumped through the coolant passage 20 so as to prevent the nozzle insert 16 from either melting or deteriorating too rapidly during normal operation of the plasma gun. In the event that the nozzle insert 16 becomes too pitted or develops a hole therethrough so that the coolant from the coolant passage 20 exits through the hole into the throat of the nozzle illustrated generally at 22, the nozzle insert 16 can be removed from the anode body 12 and a new insert installed. Since the nozzle insert 16 is metal and must be in electrical contact with the anode body 12, it is preferable to secure the nozzle insert 16 to the anode body 12 by electrically conductive screws or the like in a manner well known in the prior art but not shown here for it is not an element of the invention.

In order to assure proper cooling of the gun, the wall thickness of the nozzle generally at 21 is preferably about 0.1 inches although if it falls within the range of about 0.075 to 0.2 inches, acceptable results are achieved. To further facilitate cooling, the coolant passage height T lies in the range of about 0.03 to 0.05 inches with 0.04 being preferred. Sufficient coolant flow through the passage 20 is required to prevent nozzle melting and those skilled in the art can determine the necessary coolant flow rate required for this purpose.

In order to assure that the coolant in the passage 20 does not escape therefrom, two compressible O-rings 24 and 26 are disposed between the nozzle insert 14 and the anode body 12 at points on either side of the passage 20 to prevent seepage of the coolant from the passage 20. These O-rings 24 and 26 are preferably made of silicone rubber, which has been found to be suitable for service under the high heat conditions experienced in a plasma spray gun of the type illustrated in FIG. 1.

The rear face of the cathode body 10 has an opening therein, illustrated generally at 30. The opening 30 includes a threaded portion indicated generally at 32 for engaging threads on the outer surface of the shank portion of the cathode member 34. At the rightmost end of the shank portion of the cathode member 34 as viewed in FIG. 1, a head 36 is integrally formed therewith having a slot 40 for receiving the tip of a screwdriver or the like permitting the cathode member to be tightly screwed into the cathode body 10. At the leftmost end of the shank of the cathode member 34 is a tip portion 42, preferably made of thiorated tungsten, in the shape of a truncated cone and located symetrically with respect to and radially inward of the tapered portion 44. The leftmost (forwardmost) end of the tip 42 is circular in shape, thereby defining a plane, which is perpendicular to the longitudinal axis of the nozzle throat 22. As illustrated by the doubleheaded arrow labeled A, the diameter of the forwardmost surface of the tip 42 has a diameter of A.

As illustrated in FIG. 1, the nozzle insert 16 includes a generally cylindrically-shaped nozzle throat illustrated generally at 22. The leftmost end of the cylindrical bore may be flaired or stepped to a large diameter cylindrical bore if desired. There is, however, a tapering or conical shaped portion communicating therewith illustrated generally at 44. As illustrated by the doubleheaded arrow labeled B, the cylindrical portion of the nozzle throat 22 has a diameter of B. The sides of the tapering portion 44 are disposed at an angle to the cylindrical portion, which is illustrated by the dotted lines 50 and 52 which project forwardly from the tapered portion 44 towards the leftmost opening of the nozzle throat 22 from the sides of the tip 42. As illustrated, the two dotted lines 50 and 52 form an angle between them of approximately 40° which means the conical shaped portion joins the cylindrical portion at an angle K of approximately 160°.

In a similar fashion, dotted lines 54 and 56 can be drawn from the truncated cone of the tip 42 projecting towards the leftmost end of the nozzle throat 22. These lines 54 and 56 form an angle of approximately 30° between them. Accordingly, the closest point between the tip 42 and the tapered portion 44 of the nozzle insert 16 has a distance as illustrated by the doubleheaded arrow C.

If the lines 50 and 54 are projected forward until they intersect, the angle formed therebetween is about 5°. It is preferred that the angle should be about 5° regardless of the value of the angle between lines 50 and 52 or the angle between lines 54 and 56. However, this angle may vary from about 0° to about 10°.

A gas distribution ring 60 is illustrated in cross section. The gas distribution ring 60 is preferably made of high temperature plastic or ceramic and has a rearwardly facing surface 62, which bears against the forward facing surface of the cathode body 10 as illustrated in FIG. 1 generally at 64. The gas distribution ring 60 includes a forward facing surface 66 which, as illustrated in FIG. 1, bears against the rear surface of the anode body 12 as illustrated generally at 70.

Figure 2:
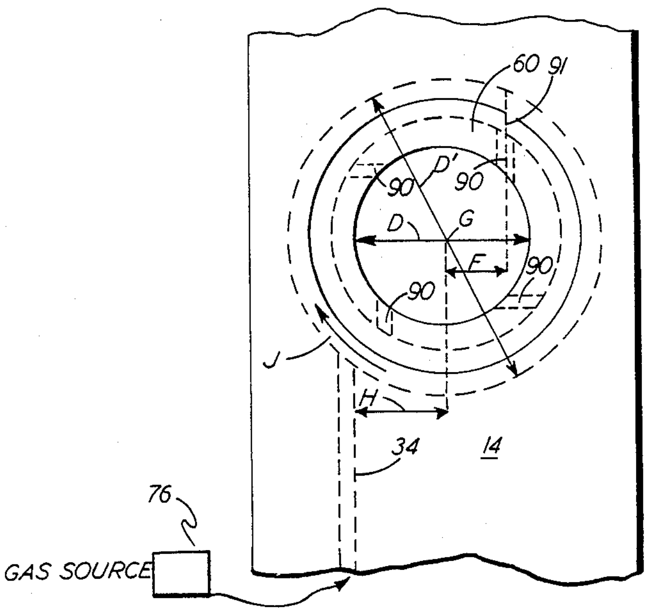
FIG. 2 is a view from the right of the insulator block and gas distribution ring in FIG. 1.

As illustrated in FIG. 2, the gas distribution ring 60 fits into the insulator block 14. The shape of the insulator block 14 and the distribution ring 60 defines a generally annularshaped gas distribution chamber 72 between them. The gas distribution chamber 72 is coupled via a passageway 74 interior to the insulating block 14 to a gas source 76 which is located exterior to the spray gun assembly. The passageway 74 is specifically located so as to introduce gas into the chamber 72 a distance H from the center line 91 passing through the center G. This configuration causes the introduced gas to swirl around the chamber 72 in a clockwise direction when viewed in FIG. 2 as illustrated by arrow J. For the configuration of FIG. 2, it will be noted that the holes 90 are either perpendicular to or parallel to the inlet passageway 74 and arranged to easily receive the swirling gas in the chamber 72. However, those of skill in the art will recognize that either more or fewer holes 90 could be employed so long as the vortex created in area 80 by each such hole 90 compliments each other. This arrangement is particularly valuable in guns with small gas distribution chamber because it is difficult otherwise to assure uniform distribution in the chamber and thus a uniform gas flow through each gas vortex producing hole 90. Unless uniform distribution of gas is achieved through the holes, the plasma flame issuing from the gas is skewed at an angle which will decrease the working lifetime of the gun parts. This problem is especially acute with flat tipped cathodes.

In the preferred embodiment, the diameter D is about 0.6 inches and the distance H is about 0.2 inches. The distance H, however, can vary as can the diameter D. As such, the maximum for distance H is about equal to D′/2 less one half the diameter of the passage 74 where D′ is the outer diameter of the annular gas distribution passage 72. The distance H at a minimum is greater than zero although it is preferably greater than D/2.

The gas source 76 itself is a source for gases such as nitrogen, helium and preferably argon, optimally containing a secondary gas such as hydrogen or helium, which may be used in plasma spray applications. The gas is delivered from the gas source 76 under pressure via the internal passage 74 to the gas distribution chamber 72. The gas is then distributed by holes 90 passing through the gas distribution ring 60 into a generally annular shaped gas flow area 80, as illustrated in FIG. 1, which is formed between the cathode member 34, the cathode body 10, the anode body 12 and the nozzle insert 16.

Each hole 90 through the gas distribution ring 60 serves to produce a vortex. There are preferably a plurality of passage holes 90 formed in the gas distribution ring 60 in a manner best illustrated in FIG. 2. These holes 90 comprise a passageway for gas to flow from the gas distribution chamber 72 and into the generally annular shaped gas flow area 80 which encircles the cathode 34. The holes 90 as illustrated in FIG. 2 are four in number and extend in a direction either perpendicular to or parallel to the diameter illustrated by the doubleheaded arrow D. Each hole 90 has a longitudinal axis such as dotted line 91, which perpendicularly intersects a radius ($\frac{1}{2}$ of the diameter doubleheaded arrow labelled D) at a distance F from the center G of the opening in the block 14 through which the cathode projects as illustrated in FIG. 1. In the preferred embodiment of the present invention it has been found that the distance F is preferably equal to approximately one-third the diameter D of the opening in block 14 which encircles the cathode although F may vary from about A/4 to D/2 less the radius of the hole 90.

In operation, a gas is supplied from the gas source via the internal tangential gas introducing passage 74 into and around the gas distribution chamber 72 in the direction of the arrow J. Gas leaves the chamber 72 and enters the gas flow area 80 via the holes 90. Since these holes 90 are offset from the center of the gas distribution ring 60, these holes 90 cause a vortex-like gas flow to be created in the gas flow area 80. The swirling gases then leave this area 80 and pass between the tip 42 and the tapered wall portion 44 of the nozzle insert 16. Then the gases flow through the cylindrically-shaped bore of the nozzle throat 22 and exit the gun at its leftmost end as viewed in FIG. 1. Electrical power is coupled to the cathode body 10 and the anode body 12 from an external power source (not shown) in a manner conventional for plasma spray guns. This electrical power source causes an arc to be formed between the tip 42 and the nozzle insert 16. This arc causes the formation of a plasma flame which issues from the forward end of the nozzle insert 16.

In order to prevent the gas from escaping from the assembly as illustrated in FIG. 1, additional O-rings or optionally gaskets 100, 102 and O-ring 104 are provided to keep the gas within the desired gas flow area. The O-ring 100 serves to seal against gas leakage between the boundary of the insulator block 14 and the anode body 12. The O-ring 102 serves to prevent gas leakage along the boundary between the cathode body 10 and the insulator block 14. The O-ring 104 serves to prevent gas from flowing through the threads generally at 32.

A plasma gun of a configuration substantially as illustrated in FIG. 1 can be made with differing relative sizes for the various parts while still maintaining overall good operation. For a small plasma spray gun by way of example, the diameter A can have a range of up to as large as the diameter B to a minimum of approximately 0.060 inches with a diameter of 0.11 inches being typical. The diameter B typically would have a range between 0.3 and 0.125 inches with a typical diameter B being approximately 0.21 inches or approximately twice the diameter of A. The distance C (the shortest distance between the tip 42 and the nozzle 16) typically has a maximum of approximately 0.13 inches and a minimum of approximately 0.015 inches with 0.06 inches being typical. In addition to the foregoing dimensions, a typical configuration would have a diameter D for the gas distribution ring of approximately 0.6 inches while having a thickness of between 0.16 and 0.19 inches. The size of the holes serves to modify the vortex which is useful for it has been found that for argon gas a strong vortex is desirable while for nitrogen a less strong vortex is desired. Accordingly, for argon a typical diameter of the hole 90 is about 0.031 inches and for nitrogen, the diameter of the hole 90 is about 0.062. The holes 90 through the ring typically may be as large as 0.2 inches or as small as 0.02 inches in diameter.

The flat tipped cathode 34 according to the invention is located so its tip portion 42 extends into the area surrounded by the conical-shaped portion 44 of the nozzle insert 16. The gas introduced by the gas distribution ring 60 swirls past the cathode tip 42. An arc is formed between the tip 42 and the nozzle insert 16 which rapidly rotates around the periphery of the flat forward surface of the tip 42. This results in reduced erosion thereby allowing longer life of the gun parts at higher power levels. This configuration also requires less cooling than for other designs of comparable size and power and provides more efficiency.

The foregoing dimensions have been provided as a reader convenience and in order to more particularly describe one embodiment of the present invention having as a particular useful characteristic thereof the fact that the plasma spray gun itself is physically quite small while providing improved performance compared to previously manufactured plasma spray guns. Accordingly, the gun can be used in plasma flame spraying of objects which heretofore could not previously have been sprayed. Those of skill in the art, however, will recognize that the objects, advantages and features of the present invention may be utilized in plasma spray guns having dimensions significantly different from those described above without departing from the spirit and scope of the present invention as defined in the following claims.

What is claimed is:

1. A plasma spray gun comprising, in combination:

a nozzle member with a substantially cylindrical bore and a substantially conical shape portion communicating with said cylindrical bore, an electrode with a truncated conical shaped tip disposed relative to said nozzle so that at least a portion of said tip is disposed symmetrically with respect to and radially inward of the wall of said conical shaped portion of said nozzle member;

plasma gas distribution means disposed radially outward of and encircling said electrode for introducing plasma gas into the region disposed between said electrode and said nozzle to produce a uniform vortex flow of plasma gas in the region disposed between said electrode and said nozzle; and a tangential gas introducing passage communicating at one end thereof with said gas distribution means and for coupling at the other end thereof to a source of plasma gas, said gas introducing passage being disposed to cause gas flow into and around said gas distribution means in one direction.

2. The plasma spray gun of claim 1 wherein the tip of said electrode is made of thoriated tungsten.

3. The plasma spray gun of claim 1 additionally including means to cool the walls of said nozzle member.

4. The plasma spray gun of claim 1 wherein said gas distribution means includes a gas distribution passage encircling said electrode and a plurality of tangential passages communicating between said gas distribution passage and the area disposed between said gas distribution means, said electrode and said nozzle to create a vortex of gas in the region disposed between said electrode and said nozzle.

5. The plasma spray gun of claim 4 wherein said tangential passages are all equal in size.

6. The plasma spray gun of claim 4 wherein said tip has an angle of its sides to a symmetry axis through said tip of about 15°.

7. The plasma spray gun of claim 1 wherein the angle formed between a forward projecting line from the tip of said electrode and a forward projecting line from the conical portion of said nozzle is approximately 5°.

8. A plasma spray gun comprising in combination:

a nozzle member with a substantially cylindrical bore and a substantially conical shaped portion communicating therewith;

an electrode with a truncated conical shaped tip disposed relative to said nozzle so that at least a portion of said tip is positioned symmetrically with respect to and radially inward of the wall of said conical shaped portion;

means to support said electrode;

an annular plasma gas distribution passage located in a member encircling said electrode;

a plurality of gas introducing passages communicating between said gas distribution passage and the area between said member encircling said electrode and said electrode, said gas introducing passages being arranged to introduce plasma gas into the region between said tip and said conical shaped portion to produce a uniform vortex flow of plasma gas in the region between said tip and said conical shaped portion; and a tangential gas introducing passage communicating at one end thereof with said gas distribution passage and for coupling at the other end thereof to a source of plasma gas, said gas introducing passage being disposed to cause gas to flow around said gas distribution passage in one direction.

9. The plasma spray gun of claim 8 wherein each said gas introducing passage has longitudinal axis thereof which perpendicularly crosses a radius drawn from the longitudinal center line of said electrode to the inner surface of said gas distribution ring at a distance F from the longitudinal center line of said electrode where F equals about ⅓ the diameter of said gas distribution ring.

10. The plasma spray gun of claim 8 wherein said tip is shaped so that a forward projecting line from the side of said tip intersects the center line of said electrode at an angle of about 15°.

11. The plasma spray gun of claim 8 wherein said conical shaped portion of said nozzle is shaped so that a forward projecting line therefrom intersects the center line of said electrode at an angle of about 20°.

12. In a plasma spray gun including an electrode, means to support the electrode and a nozzle, a gas introducing means comprising, in combination:

means defining an annular gas distribution passage disposed symmetrically with respect to said electrode said plasma gas distribution means being formed in an insulator means disposed between said nozzle and said electrode support means;

a plurality of tangential passages between said gas distribution passage and the area surrounding said electrode, said tangential passages creating a vortex gas flow in the area surrounding said electrode;

means for coupling said gas distribution passage to a gas supply to introduce gas into said gas distribution passage, said gas being introduced into said distribution passage in a manner to produce gas movement around said gas distribution passage in one direction which serves to equalize the gas flow through each of said tangential passages.

13. The plasma spray gun of claim 12 wherein said tangential passages are located symmetrically around said annular gas distribution passage.

14. The plasma spray gun of claim 12 wherein each tangential passage has a longitudinal axis which perpendicularly crosses a radius drawn from the center of said annular gas distribution passage to said gas distribution passage at a distance F which is equal to about ⅓ the diameter of the area encircling said electrode.

15. The plasma spray gun of claim 12 wherein said coupling means introduces gas into said gas distribution passage in a tangential direction.

16. The plasma spray gun of claim 12 wherein said coupling means introduces gas into said gas distribution passage in a direction which perpendicularly crosses a radius of said annular gas distribution passage at a distance H from the center of said annular shaped passage where H is greater than F.

17. In a plasma spray gun including an electrode and a nozzle, said electrode being disposed to project at least partically into one end of said nozzle, a gas introducing means comprising, in combination:

an insulator member disposed between said electrode and said nozzle to electrically isolate said electrode from said nozzle, said insulator member forming a cylindrically shaped area for circling said electrode;

a gas distribution chamber formed in said insulator member and encircling said electrode;

a plurality of tangential passages formed in said insulator member for communicating between said gas distribution chamber and the area radially inward of said insulator member and radially outward of said electrode;

each said tangential passage being located so that its longitudinal axis intersects a radius of said cylindrically shaped area at a distance F from the longitudinal axis of said cylindrically shaped area where F is about one-third the diameter of said cylindrically shaped area;

a tangential gas introducing passage for communicating at one end thereof with said gas distribution chamber and for coupling at the other end thereof to a source of plasma gas, said gas introducing passage being disposed to cause gas flow around said gas distribution chamber in one direction.

18. The plasma spray gun of claim 1 additionally including a coolant passage surrounding said cylindrical bore of said nozzle, said coolant passage having a height in the range of 0.03 to 0.05 inches.

19. The plasma spray gun of claim 12 wherein said nozzle includes a cylindrical portion and a conical shaped portion communicating therewith and said electrode includes a truncated conical shaped tip disposed to project at least partially into said conical portion.

20. The plasma spray gun of claim 1 or 18 or 19 wherein said conical shaped portion joins said cylindrical shaped portion at an angle of about 160°.

21. The plasma spray gun of claim 1 or 18 or 19 wherein said conical shaped portion and said conical tip are shaped so that two forwardly projecting lines in one plane coextensive with the said conical shaped portion and coextensive with the edge of said tip will intersect at an angle in the range of about 0° to about 10°.

22. The plasma spray gun of claim 21 where said two lines intersect at an angle of about 5°.

23. The plasma spray gun of claim 19 additionally including a coolant passage surrounding said cylindrical portion, said coolant passage having a height in the range of 0.03 to 0.05 inches.

* * * * *